US006923874B2

(12) United States Patent
Jared et al.

(10) Patent No.: US 6,923,874 B2
(45) Date of Patent: Aug. 2, 2005

(54) PROCESS TO CLEAN POLYMERIC ARTICLE, SUCH AS POLYURETHANE GLOVE, SO AS TO REMOVE NON-VOLATILE RESIDUES AND LOW-VOLATILITY RESIDUES

(75) Inventors: Lee John Jared, San Diego, CA (US); Ferdinand Frederick Pisacane, Carlsbad, CA (US); Michael O'Neill, Middletown, DE (US)

(73) Assignees: Invista North America S.A.R.L., Wilmington, DE (US); The Recovery Group, Inc., Boston, MA (US)

( * ) Notice: Subject to any disclaimer, the term of this patent is extended or adjusted under 35 U.S.C. 154(b) by 154 days.

(21) Appl. No.: 10/668,429

(22) Filed: Sep. 23, 2003

(65) Prior Publication Data

US 2004/0144407 A1 Jul. 29, 2004

Related U.S. Application Data

(63) Continuation of application No. 09/904,455, filed on Jun. 12, 2001, now Pat. No. 6,634,369.

(51) Int. Cl.[7] .............................. C11D 7/50; C11D 3/48; C09D 9/00

(52) U.S. Cl. .......................... 134/40; 510/407; 510/505

(58) Field of Search ..................... 134/38, 40; 510/407, 510/506, 212, 499, 202, 505; 252/364

(56) References Cited

U.S. PATENT DOCUMENTS

| | | | | |
|---|---|---|---|---|
| 2,318,657 A | | 5/1943 | Alexander | |
| 3,412,184 A | | 11/1968 | Sharples et al. | |
| 3,793,059 A | | 2/1974 | Wollman et al. | |
| 3,919,442 A | | 11/1975 | Esemplare et al. | |
| 3,967,014 A | | 6/1976 | Esemplare et al. | |
| 4,027,060 A | | 5/1977 | Esemplare et al. | |
| 4,082,862 A | | 4/1978 | Esemplare et al. | |
| 4,242,298 A | | 12/1980 | Gurske | |
| 4,299,951 A | | 11/1981 | Campbell | |
| 4,496,456 A | | 1/1985 | Hafez et al. | |
| 5,089,205 A | * | 2/1992 | Huang et al. | 264/255 |
| 5,482,659 A | | 1/1996 | Sauerhoefer | |
| 5,601,870 A | * | 2/1997 | Haung et al. | 427/133 |
| 5,741,885 A | * | 4/1998 | Dove | 604/349 |
| 5,772,935 A | | 6/1998 | Zhadanovsky | |
| 5,962,383 A | | 10/1999 | Doyel et al. | |
| 6,187,108 B1 | | 2/2001 | Machac et al. | |
| 6,497,432 B2 | | 12/2002 | Scheib et al. | |
| 6,586,110 B1 | | 7/2003 | Obeshaw | |
| 6,634,369 B2 | * | 10/2003 | Jared et al. | 134/22.1 |

* cited by examiner

*Primary Examiner*—Gregory Webb
(74) *Attorney, Agent, or Firm*—Wood, Phillips, Katz, Clark & Mortimer

(57) ABSTRACT

In a process to clean a polyurethane glove, which has been cured on a glove form, so as to remove non-volatile residues and low-volatility residues from the glove before the glove is removed from the form, the form bearing the glove is immersed in a quiescent or agitated bath consisting essentially of a solvent selected from isopropyl alcohol, hexane, and blends of isopropyl and hexane, preferably isopropyl alcohol, at an elevated temperature of approximately 60° C., for a predetermined time not less than approximately five minutes, preferably for a predetermined time of approximately ten to twenty minutes, whereupon the form bearing the glove is withdrawn from the bath and the glove is allowed to be air-dried on the form.

12 Claims, No Drawings

PROCESS TO CLEAN POLYMERIC ARTICLE, SUCH AS POLYURETHANE GLOVE, SO AS TO REMOVE NON-VOLATILE RESIDUES AND LOW-VOLATILITY RESIDUES

CROSS-REFERENCE TO RELATED APPLICATION

This application is a continuation of U.S. patent application Ser. No. 09/904,455, which was filed on Jul. 12, 2001 now U.S. Pat. No. 6,634,369.

TECHNICAL FIELD OF THE INVENTION

This invention pertains to a process to clean a polymeric article, such as a polyurethane glove, so as to remove non-volatile residues and low-volatility residues from the article. The process employs a bath consisting essentially of a suitable solvent at an elevated temperature of approximately 60° C.

BACKGROUND OF THE INVENTION

Polyurethane gloves are used in clean rooms, in which microelectronic devices requiring strict control of cleanliness are handled. Polyurethane gloves made from LYCRA® by dip-forming and curing on glove forms are available commercially from Wilshire Technologies, Inc. ("Wilshire") of Carlsbad, Calif. LYCRA® is a trademark registered by E. I. DuPont de Nemours and Company ("DuPont") of Wilmington, Del., and licensed to Wilshire for a DuPont brand of polyurethane, which, as used by Wilshire to make polyurethane gloves for such use, conforms to the following specifications:

Percent solids, 18.5%±0.5%;

40° C. falling ball viscosity, 175 poise±25 poise;

Intrinsic viscosity, 1.1 poise±0.1 poise; and $TiO_2$, 3.5%±0.3%.

Polyurethanes including LYCRA®, *supra*, tend to comprise, in any given batch used for dip-forming of gloves or other articles, fractions of low, intermediate, and high molecular weights. Notoriously, polyurethane fractions of low molecular weights tend to form excessively high levels of low-volatility residues, which detract from cleanliness of dip-formed articles, such as dip-formed gloves. Therefore, despite polyurethanes having other characteristics favoring their use for gloves for clean rooms, their use for gloves for such use has been inhibited.

Commonly, a sample glove from a batch of polyurethane gloves intended for such use is tested for cleanliness by immersing the sample glove from the batch, in a quiescent bath consisting essentially of a solvent selected form isopropyl alcohol, hexane, acetone, and blends of isopropyl alcohol and hexane, at ambient temperature, for a predetermined time. Varying from one prospective user to another, the predetermined time may be as short as approximately twenty minutes, or as long as approximately twenty-four hours. After the predetermined time, the sample glove is withdrawn from the bath and all volatiles are evaporated from the batch, so as to leave non-volatile residues and low-volatility residues, which may includes oils, waxes, and polyurethane fractions of low molecular weights. The non-volatile and low-volatility residues from the batch are weighed collectively. If their collective weight exceeds a predetermined tolerance, the batch is rejected.

Commonly, gloves for clean rooms are cleaned with deionized water, which removes only surface contaminants.

Cleaning of such gloves with deionized water does not deliver such extremely low levels of non-volatile and low volatility residues as users demand.

Commonly, gloves for clean rooms are washed with a washing solution, in a commercial washing machine. Because much of the washing solution becomes trapped within the washed gloves, it becomes costly, difficult, and time-consuming to dry such gloves.

Alternatively, gloves for clean rooms are cleaned with a solvent, such as isopropyl alcohol, in a commercial dry-cleaning machine, in which much of the solvent becomes trapped within the washed gloves. In such a machine, the temperature must be maintained at a safe level below the flash point of the solvent. Drying of isopropyl alcohol and other solvents having low flash points requires costly explosion-proof equipment.

SUMMARY OF THE INVENTION

This invention provides a process to clean a polymeric article so as to remove non-volatile residues and low-volatility residues from the article. Broadly, the process comprises immersing the article in a bath consisting essentially of isopropyl alcohol, at an elevated temperature of approximately 60° C., for a predetermined time not less than approximately five minutes, preferably for a predetermined time of approximately ten to twenty minutes, withdrawing the article from the bath, and drying the article, as by allowing the article to be air-dried.

The process provided by this invention can be effectively employed to clean a polymeric article, as cured on a form, before the article is removed from the form. Thus, the process provided by this invention comprises immersing the form bearing the article in a bath consisting essentially of a solvent selected from isopropyl alcohol, hexane, and blends of isopropyl and hexane, at an elevated temperature of approximately 60° C., for a predetermined time not less than about five minutes, preferably for a predetermined time of approximately ten to twenty minutes, withdrawing the form bearing the article from the bath, and drying the article on the form, as by allowing the article to be air-dried on the form.

Although the process provided by this invention is intended particularly to clean polyurethane gloves for use in clean rooms, the same process is expected to be also useful to clean polyurethane gloves for use inj pharmaceutical manufacturing facilities, or for use in medical or surgical facilities, to clean other polyurethane products, such as finger cots and condoms, and to clean gloves and other products made form polymers other than polyurethanes, e.g., acrylonitrile or natural latex.

Although the bath may be quiescent or agitated, it is preferred for the bath to be agitated, either mechanically or via bubbling of air or another gaseous medium that is inert relative to the bath.

DETAILED DESCRIPTION OF THE PREFERRED MODE

In a preferred mode for carrying out this invention, a polyurethane glove is made from LYCRA®, *supra*, on a glove form, by steps of dipping, detakifying, and curing, which steps are outside the scope of this invention. The glove, which may be one of a batch of polyurethane gloves made similarly, is cleaned, as described below, before the glove is removed from the form.

Specifically, when the glove is cleaned in the preferred mode for carrying out this invention, the form bearing the article is immersed in a quiescent or agitated bath consisting essentially of a solvent selected from isopropyl alcohol, hexane, and blends of isopropyl and hexane, preferably a mechanically agitated bath consisting essentially of isopropyl alcohol, at an elevated temperature of approximately 60° C., for a predetermined time of approximately ten to twenty minutes. Because of the time and temperature conditions and the solvent selection, the solvent effectively removes residues from inside the glove as well as from outside the glove.

Thereupon, the form bearing the glove is withdrawn from the bath and the glove is dried, as by being allowed to be air-dried on the form. After the glove is dried on the form, the glove is removed from the from in a conventional manner. Because the glove remains on the form when the form bearing the glove is immersed in the bath, little if any solvent is carried between the form and the glove when the form bearing the article is withdrawn from the bath. Hence, as contrasted with drying that would be required if much of the solvent were to be carried within the glove, drying of the solvent is simplified.

The cleaned glove and a glove made similarly but not cleaned similarly are tested comparatively, each glove being immersed in a separate, quiescent bath consisting essentially of a solvent selected from isopropyl alcohol, hexane, acetone, and blends of isopropyl and hexane, at ambient temperature, for approximately ten minutes. From each of the separate baths, all volatiles are evaporated from the bath, so as to leave non-volatile residues and low-volatility residues, which residues are weighed collectively. The collective weights of such non-volatile and low-volatility residues from the separate baths are compared. The collective weight of such non-volatile and low-volatility residues from the bath for the cleaned glove is found to be approximately ten percent of the collective weight of non-volatile residues from the bath for the other glove.

The following table, in which residue weights are set forth in parts-per-million, compares six similarly made, polyurethane gloves, wherein the form bearing each glove is immersed in a separate, quiescent batch consisting essentially of isopropyl alcohol, for the time set forth, at the temperature set forth, whereupon all volatiles are evaporated from the bath, so as to leave non-volatile residues and low-volatility residues, which residues are weighed collectively.

| Test | Time | Temperature | Residue Weight |
|---|---|---|---|
| #1 | 5 min. | 18° C. | 3815 |
| #2 | 10 min. | 18° C. | 3367 |
| #3 | 30 min. | 18° C. | 2924 |
| #4 | 10 min. | 47° C. | 1514 |
| #5 | 30 min. | 44° C. | 1059 |
| #6 | 20 min. | 60° C. | 190 |

Thus, this invention provides a highly effective process, which meets the time and cost requirements of the cost-sensitive electronics industry.

What is claimed is:

1. A process to clean a polymeric article so as to remove non-volatile residues and low-volatility residues from the article, which process comprises immersing the article in a bath consisting essentially of a solvent selected from isopropyl alcohol, hexane, and blends of isopropyl and hexane, at an elevated temperature of approximately 60° C., for a predetermined time not less than approximately five minutes, withdrawing the article from the bath, and drying the article, wherein the article is one taken from a bath with other articles immersed in the bath and the bath is examined for non-volatile and low-volatility residues removed from inside and outside surfaces of the article.

2. The process of claim 1 wherein ding is accomplished by allowing the article to be air-dried.

3. The process of claim 1 wherein the predetermined time is approximately ten to twenty minutes.

4. The process of claim 2 wherein the predetermined time is approximately ten to twenty minutes.

5. A process to clean a polyurethane glove so as to remove non-volatile residues and low-volatility residues from the glove, which process comprises immersing the article in a bath consisting essentially of a solvent selected from isopropyl alcohol, hexane, and blends of isopropyl and hexane, at an elevated temperature of approximately 60° C., for a predetermined time not less than approximately five minutes, withdrawing the article from the bath, and drying the article, wherein the glove is one taken from a bath with other gloves immersed in the bath and the bath is examined for non-volatile and low-volatility residues removed from inside and outside surfaces of the glove.

6. The process of claim 5 wherein drying is accomplished by allowing the article to be air-dried.

7. The process of claim 5 wherein the predetermined time is approximately ten to twenty minutes.

8. The process of claim 6 wherein the predetermined time is approximately ten to twenty minutes.

9. The process of any one of claims 1 through 8 wherein the batch is quiescent.

10. The process of any one of claims 1 rough 8 wherein the batch is agitated.

11. The process of claim 10 wherein the batch is agitated mechanically.

12. The process of claim 10 wherein the batch is agitated via bubbling of air or another gaseous medium that is inert relative to the bath.

* * * * *